T. A. DODD.
CIGAR BOX.

No. 181,057.  Patented Aug. 15, 1876.

WITNESSES:
Gustave Dieterich
John Goethals

INVENTOR:
T. A. Dodd
BY
ATTORNEYS.

N. PETERS, PHOTO-LITHOGRAPHER, WASHINGTON, D.C.

UNITED STATES PATENT OFFICE.

THOMAS A. DODD, OF PROVIDENCE, RHODE ISLAND.

IMPROVEMENT IN CIGAR-BOXES.

Specification forming part of Letters Patent No. 181,057, dated August 15, 1876; application filed May 9, 1876.

*To all whom it may concern:*

Figure 1:
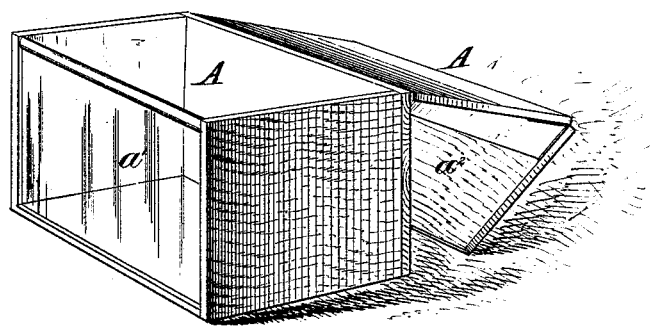
Figure 2:
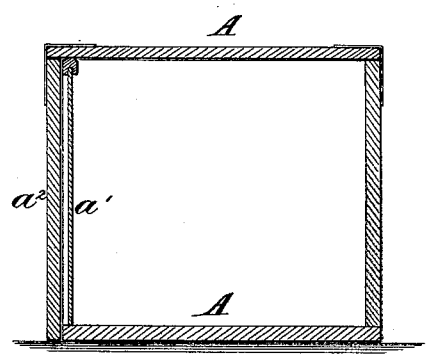

Be it known that I, THOMAS A. DODD, of Providence, in the county of Providence and State of Rhode Island, have invented a new and Improved Cigar-Box, of which the following is a specification:

Figure 1 is a perspective view of my improved cigar-box opened. Fig. 2 is a cross-section of the same closed.

The object of this invention is to furnish an improved cigar-box, which shall be so constructed as to allow the ends of all the cigars in it to be seen, as well as the top layer, and which may be securely closed, when desired.

The invention consists in a cigar-box provided with a glass front, and having a flap hinged to the forward edge of its top or cover, to shut down over said glass front, as hereinafter fully described.

A, a cigar-box, the bottom, ends, back, and cover of which are constructed in the usual way. The front of the box A is formed of a glass plate, $a^1$, so that the ends of all the cigars packed in the box may be seen through it. To the forward edge of the top or cover of the box A is hinged a flap, $a^2$, which may be turned down over the glass front $a^1$, to cover and protect it, when desired, as shown in Fig. 2; or may be turned up to rest upon the top of the box.

The flap and cover may be turned back together, as shown in Fig. 1, to give access to the contents of the box.

Having thus described my invention, what I claim as new, and desire to secure by Letters Patent, is—

A cigar-box, A, provided with a glass front, $a^1$, and having a flap, $a^2$, hinged to the forward edge of its top or cover, to shut down over said glass front, substantially as herein shown and described.

THOMAS A. DODD.

Witnesses:
    JOHN KENYON,
    ALFRED Y. HAMILTON.